United States Patent
Khan

(10) Patent No.: US 11,269,976 B2
(45) Date of Patent: *Mar. 8, 2022

(54) APPARATUS AND METHOD FOR WATERMARKING A CALL SIGNAL

(71) Applicant: Saudi Arabian Oil Company, Dhahran (SA)

(72) Inventor: Faisal Hassan Khan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 429 days.

This patent is subject to a terminal disclaimer.

(21) Appl. No.: 16/358,906

(22) Filed: Mar. 20, 2019

(65) Prior Publication Data

US 2020/0302036 A1    Sep. 24, 2020

(51) Int. Cl.
*G06F 21/16*   (2013.01)
*G06F 21/64*   (2013.01)
*G10L 19/018*  (2013.01)

(52) U.S. Cl.
CPC .............. *G06F 21/16* (2013.01); *G06F 21/64* (2013.01); *G10L 19/018* (2013.01); *G06F 2221/0733* (2013.01); *G06F 2221/0737* (2013.01)

(58) Field of Classification Search
CPC .. G06F 21/16; G06F 21/64; G06F 2221/0733; G06F 2221/0737; G10L 19/018; H04M 2203/6027; H04M 2203/6045; H04M 3/568

See application file for complete search history.

(56) References Cited

U.S. PATENT DOCUMENTS

| | | | | |
|---|---|---|---|---|
| 6,502,194 | B1* | 12/2002 | Berman | G06Q 30/0601 370/231 |
| 6,961,850 | B1* | 11/2005 | Stebbings | G10L 19/018 704/E19.009 |
| 7,197,164 | B2 | 3/2007 | Levy | |
| 8,045,748 | B2* | 10/2011 | Levy | G06F 21/10 382/100 |

(Continued)

FOREIGN PATENT DOCUMENTS

| KR | 20180005470 A | 1/2018 |
|---|---|---|
| WO | 2015/012680 | 1/2015 |

OTHER PUBLICATIONS

International Search Report and Written Opinion in Corresponding Patent Application No. PCT/US2020/023156 dated Jun. 8, 2020. 10 pages.

(Continued)

*Primary Examiner* — David Garcia Cervetti
(74) *Attorney, Agent, or Firm* — Leason Ellis LLP

(57) ABSTRACT

An apparatus and method for determining a source of an unauthorized copy of speech signals in a conference call session. A conference bridge receives a speech signal during a conference call session with a plurality of end user devices attending. The conference bridge provides one or more dynamic, end user specific watermarks corresponding to the one or more end user devices. Each watermark is adjusted based on characteristics of the speech signal to make the watermark imperceptible to a human being. The speech signal is then embedded with the adjusted watermark in real time to generate a modified speech signal.

20 Claims, 7 Drawing Sheets

(56) References Cited

U.S. PATENT DOCUMENTS

| | | | |
|---|---|---|---|
| 8,081,757 B2* | 12/2011 | Voessing | G10L 19/018 380/238 |
| 8,121,264 B1 | 2/2012 | Hogg, Jr. et al. | |
| 9,774,743 B2* | 9/2017 | Tan | H04M 3/568 |
| 9,848,003 B2* | 12/2017 | Stevens | G06F 21/85 |
| 9,905,233 B1* | 2/2018 | Thagadur Shivappa | G10L 19/018 |
| 10,236,006 B1* | 3/2019 | Gurijala | G10L 19/06 |
| 10,554,931 B1* | 2/2020 | Zavesky | G10L 15/18 |
| 2001/0019618 A1 | 9/2001 | Rhoads | |
| 2002/0169608 A1* | 11/2002 | Tamir | G06K 19/077 704/246 |
| 2003/0081779 A1* | 5/2003 | Ogino | H04N 19/467 380/207 |
| 2003/0202680 A1* | 10/2003 | Hayashi | G06T 1/0064 382/100 |
| 2005/0025126 A1 | 2/2005 | Patfield | |
| 2005/0049970 A1* | 3/2005 | Sato | G06F 21/16 705/51 |
| 2005/0135614 A1* | 6/2005 | Hollar | H04L 12/40104 380/201 |
| 2005/0213729 A1* | 9/2005 | Rodman | H04L 12/1813 379/202.01 |
| 2005/0220095 A1 | 10/2005 | Narayanan et al. | |
| 2005/0262347 A1* | 11/2005 | Sato | G06F 21/16 713/176 |
| 2007/0079130 A1* | 4/2007 | Vandewater | G06F 21/10 713/176 |
| 2007/0112565 A1* | 5/2007 | Kim | G10L 25/48 704/229 |
| 2007/0242826 A1* | 10/2007 | Rassool | H04N 21/8358 380/201 |
| 2007/0277039 A1* | 11/2007 | Zhao | G11B 20/00884 713/176 |
| 2009/0034704 A1* | 2/2009 | Ashbrook | H04L 12/1822 379/142.04 |
| 2009/0080689 A1* | 3/2009 | Zhao | H04N 19/467 382/100 |
| 2009/0086631 A1 | 4/2009 | Jayapalan et al. | |
| 2010/0057231 A1* | 3/2010 | Slater | G10L 19/018 700/94 |
| 2010/0080413 A1* | 4/2010 | Chen | H04N 21/41407 382/100 |
| 2012/0042332 A1* | 2/2012 | Wajs | H04N 21/8456 725/31 |
| 2013/0106987 A1* | 5/2013 | Wang | H04L 12/1818 348/14.08 |
| 2013/0166868 A1* | 6/2013 | Jarnikov | H04N 21/23895 711/162 |
| 2013/0321133 A1* | 12/2013 | Michaelis | H04M 3/569 340/10.42 |
| 2013/0339455 A1* | 12/2013 | Bajaj | H04L 12/1822 709/206 |
| 2014/0105447 A1* | 4/2014 | Samari | G06F 16/683 382/100 |
| 2015/0100991 A1 | 4/2015 | Risberg et al. | |
| 2015/0221317 A1* | 8/2015 | Baum | G10L 19/018 704/500 |
| 2015/0287416 A1* | 10/2015 | Brands | H04L 9/0866 704/273 |
| 2015/0340045 A1* | 11/2015 | Hardwick | G10L 19/018 704/205 |
| 2015/0373032 A1* | 12/2015 | Stevens | H04L 63/14 713/176 |
| 2016/0049153 A1* | 2/2016 | Kakkirala | G06F 17/148 700/94 |
| 2016/0165044 A1* | 6/2016 | Chan | H04M 3/42102 455/413 |
| 2016/0275952 A1* | 9/2016 | Kashtan | H04M 3/563 |
| 2017/0034160 A1* | 2/2017 | Brands | H04W 12/04 |
| 2017/0194010 A1* | 7/2017 | Sung | G10L 25/54 |
| 2018/0109570 A1 | 4/2018 | Kowal et al. | |
| 2018/0144754 A1* | 5/2018 | Peng | H04N 21/23418 |
| 2018/0211354 A1* | 7/2018 | Kim | H04N 21/8358 |
| 2018/0324293 A1 | 11/2018 | Davis et al. | |
| 2018/0351757 A1* | 12/2018 | Reddy | H04L 63/0457 |
| 2019/0132398 A1* | 5/2019 | Patterson | H04N 21/4126 |
| 2019/0295560 A1* | 9/2019 | Christian | H04N 21/8358 |
| 2020/0065514 A1* | 2/2020 | Keen | H04L 63/0428 |

OTHER PUBLICATIONS

Mazurczyk Wojciech, et al., New VoIP Traffic Security Scheme with Digital Watermarking; J. Górski (Ed): SAFECOMP 2006, pp. 170-181, (2006).

Lie, Wen-Nung, and Li-Chun Chang. "Robust and high-quality time-domain audio watermarking based on low-frequency amplitude modification." IEEE transactions on multimedia 8.1 (2006): 46-59.

Bhat, Vivekananda, Indranil Sengupta, and Abhijit Das. "An audio watermarking scheme using singular value decomposition and dither-modulation quantization." Multimedia Tools and Applications 52.2-3 (2011): 369-383.

Mansour, Mohamed F., and Ahmed H. Tewfik. "Audio watermarking by time-scale modification." 2001 IEEE International Conference on Acoustics, Speech, and Signal Processing. Proceedings (Cat. No. 01CH37221). Vol. 3. IEEE, 2001, pp. 1353-1356.

International Search Report and Written Opinion in corresponding PCT Application No. PCT/US2019/064241 dated Feb. 21, 2020, 11 pages.

Office Action in Corresponding GCC Application No. 2020/39394, dated Jul. 29, 2021, 5 pages.

* cited by examiner

APPARATUS AND METHOD FOR WATERMARKING A CALL SIGNAL

TECHNICAL FIELD

The present disclosure relates generally to voice-based conference calls. In particular, the present disclosure relates to a system, method and computer program for watermarking a conference call signal with a unique identification signal to identify unauthorized copying or production of an audio signal in a voice-based conference call.

BACKGROUND OF THE DISCLOSURE

Sharing speech signals in a conference call presents an opportunity for anyone in the conference call to duplicate and disseminate potentially sensitive information. Unscrupulous or nefarious individuals can copy and disseminate portions of a conference call to third parties, outside of the conference call. Since a conference call typically has three or more participants, it can be difficult or impossible to determine with any certainty the source of the unauthorized copying or dissemination.

Therefore, there exists an unmet need for a technology solution that can identify the source of any unauthorized copying or dissemination of any portion of a conference call.

SUMMARY OF THE DISCLOSURE

The present disclosure provides a technology solution that can watermark a conference call to protect against unauthorized recording, reproduction, or dissemination of any portion of the conference call. According to an aspect of the disclosure, a computer-implemented method is provided for identifying a source of an unauthorized copy of a speech signal in a conference call session that includes a plurality of end user devices. The method comprises: receiving a speech signal during the conference call session; monitoring a characteristic of the speech signal; providing a watermark signal for a destination end user device that comprises a speaker device; adjusting a corresponding characteristic of the watermark signal based on the monitored characteristic of the speech signal; dynamically embedding the adjusted watermark signal in real-time in the speech signal to generate a modified speech signal; and sending the modified speech signal for reproduction on said speaker device, wherein the watermark signal uniquely identifies the destination end user device, and wherein the adjusted watermark signal is imperceptible to a human being. The method can comprise amplifying the received speech signal.

The monitored characteristic of the speech signal can include a signal level of the speech signal or a power level of the speech signal.

The receiving the speech signal during the conference call session can comprise receiving the speech signal at a conference bridge server or receiving the speech signal at the destination end user device. The receiving the speech signal during the conference call session can comprise receiving the speech signal from one of a plurality of end user devices.

The watermark can comprise login credentials. The watermark signal can contain a high frequency signal or a low frequency signal that is imperceptible by a human auditory system. The computer-implemented method of claim 1, wherein the watermark signal can be provided from a database. The computer-implemented method of claim 1, wherein the watermark signal can be generated by an end user device identification signal generator.

The adjusting the corresponding characteristic of the watermark signal can comprise amplifying the watermark signal.

According to a further aspect of the disclosure an apparatus is provided for identifying a source of an unauthorized copy of a speech signal in a conference call session that includes a plurality of end user devices. The apparatus comprises: a network interface that receives a speech signal; a power monitor that measures one or more characteristics of the speech signal; and an audio signal modifier that embeds a watermark signal in the speech signal based on the measured one or more characteristics of the speech signal to provide a watermarked speech signal, wherein watermark signal is adjusted dynamically in real-time based on the measured one or more characteristics of the speech signal, wherein the watermark signal uniquely identifies a destination end user device having a speaker device, wherein the modified speech signal is sent for reproduction on the speaker device, and wherein the watermark signal is imperceptible to a human being during reproduction on the speaker device. The apparatus can comprise an end user device identification signal generator that generates the watermark signal. The apparatus can comprise a conference bridge server. The apparatus can comprise an end user device. The one or more characteristics of the speech signal can include a signal level.

According to still further aspect of the disclosure, a non-transitory computer readable storage media containing computer executable instructions is provided, which when executed by one or more processors, cause a computing device to: receive a speech signal during a conference call session; monitor a characteristic of the speech signal; provide a watermark signal for a destination end user device that comprises a speaker device; adjust a corresponding characteristic of the watermark signal based on the monitored characteristic of the speech signal; dynamically embed the adjusted watermark signal in real-time in the speech signal to generate a modified speech signal; and send the modified speech signal for reproduction on the speaker device, wherein the watermark signal uniquely identifies the destination end user device, and wherein the adjusted watermark signal is imperceptible to a human being when the modified speech signal is reproduced on the speaker device.

Additional features, advantages, and embodiments of the disclosure may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

Figure 1:
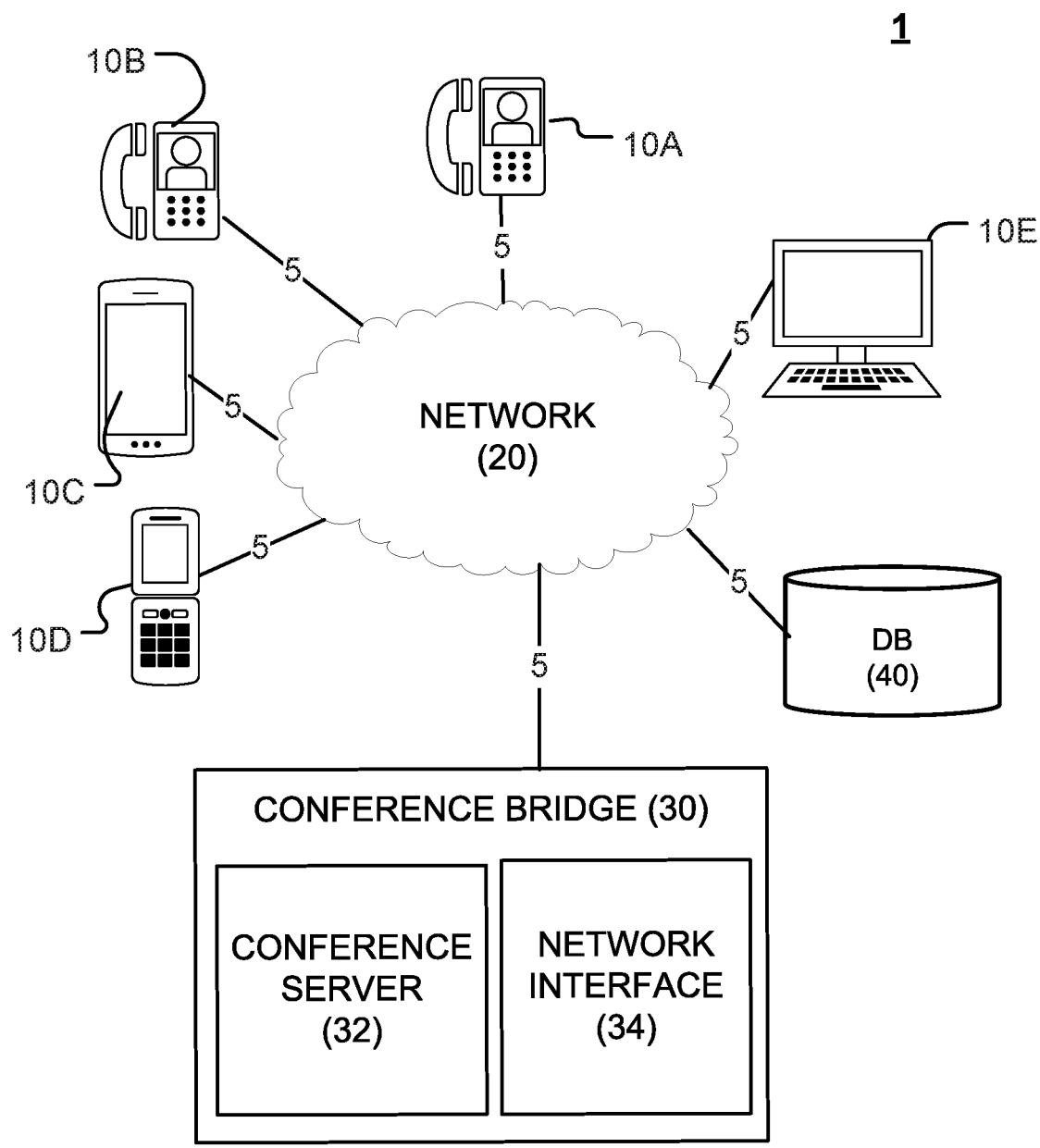
FIG. 1 illustrates a diagram of a system of end-user-devices configured to participate in a conference session with a conference bridge configured to facilitate the conference session in one or more embodiments.

The present disclosure is further described in the detailed description that follows.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following description. It should be noted that features illustrated in the drawings are not necessarily drawn to scale, and features of one embodiment may be employed with other embodiments as those skilled in the art would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those skilled in the art to practice the embodiments of the disclosure. Accordingly, the examples and embodiments herein should not be construed as limiting the scope of the disclosure. Moreover, it is noted that like reference numerals represent similar parts throughout the several views of the drawings.

By way of overview and introduction, the present disclosure provides a method, a system, and a computer program for watermarking an audio signal that can be transmitted over a network 20 (shown in FIG. 1). The audio signal can include a speech signal and the watermarking can discourage or prevent the speech signal from inappropriate or unauthorized recording, reproduction, rendering, distribution, or dissemination. The non-limiting examples disclosed herein are configured to watermark an audio signal with a dynamic, end-user-device (EUD) specific and imperceptible EUD identification ("watermark") signal.

In a conference call that can involve anywhere from two attendees to a large number of attendees, when a copy of a portion of the conference call (or the entire conference call) is made, it is beneficial if the source of the copying can be identified. For instance, where a portion of the audio signal from the conference call is reproduced or published by a third party in a public media, the instant disclosure provides a mechanism for identifying the source of the portion of the audio signal.

In order to prevent unauthorized copying of an audio signal during a conference call session, the instant disclosure can be employed to accurately and specifically identify who made an unauthorized copy of any portion of the audio signal. The disclosure provides a method and system of watermarking the audio signal with an EUD identification (ID) signal that cannot be removed without deteriorating or destroying content in the audio signal. The EUD ID signal can be dynamic and imperceptible to a human being.

According to a non-limiting example of the disclosure, a conference call signal (including an audio signal such as, e.g., a speech signal) can be protected against unauthorized copying by watermarking the conference call signal with a dynamic and attendee-specific identification signal for each EUD 10 that participates in the conference call. The watermarking can include embedding or modifying an audio signal in the conference call signal with the EUD ID signal. This can be achieved by an audio signal modifier 170 (show in FIG. 2), which can be located in an end-user-device (EUD) 10 (shown in FIG. 1) or a conference bridge 30 (shown in FIG. 1), such as, for example, in a conference server 32 (shown in FIG. 1). The EUD ID signal can include an Internet Protocol (IP) address, a Media Access Control (MAC) address, a port number, Originating Line Information (OLI) data, Caller Identification (CID) data, Automatic Number Identification (ANI) data, Calling Line Identification (CLID) data, conference identification data, a user name, an email address, a telephone number, a geolocation, login credentials, an employee identification number, a date, a time, or any other information that can uniquely identify the EUD 10 or the participant using the EUD 10. The EUD ID signal can include any information that is used by an EUD 10 to enter or access a conference call.

According to a non-limiting example of the disclosure, the conference bridge 30 and/or one or more of the EUDs 10 (shown in FIG. 1) can include a power monitor 160 (shown in FIGS. 2 and 4) that can measure and track signal characteristics of the conference call signal, including each speech signal in the conference call signal. In one non-limiting embodiment, the power monitor 160 comprises a sensor which detects parameters of a received signal, a processor configured to process data from the sensor, and a communicator adapted to transmit said data. The measured signal characteristics can include, for example, frequency, period, voltage, signal level (e.g., in dBm), signal-to-noise-ratio (SNR) (e.g., in dB), power, including peak power (e.g., in V), stress, rhythm, phasing, intonation, tempo, duration, pitch, or any other characteristic of the speech signal waveforms in the conference call signal. The EUD ID signal can be generated and embedded in the conference call signal based on the characteristic of the conference call signal measured by the power monitor 160, such that clarity of the speech signals in the conference call signal are ensured. The EUD ID signal can be embedded dynamically into the conference call signal so that each EUD 10 will receive the conference call signal with a unique EUD identification signal specific to that EUD 10 and/or participant. Thus, the EUD ID signal can be used easily to identify each EUD 10 and/or the participant without affecting the quality or the clarity of the speech signals in the conference call signal.

FIG. 1 shows an example of a conference system 1 that is constructed according to the principles of the disclosure. As seen in FIG. 1, the conference system 1 includes a plurality of end-user-devices (EUDs) 10 (e.g., 10A to 10E, individually or collectively referred to as "10"), a network 20, and a conference bridge 30. The conference system 1 can include a database 40. The conference bridge 30 can include a conference server 32. The conference bridge 30 can include a network interface 34, which can be provided as one or more separate devices or modules or included in the conference server 32. The conference bridge 30 can include one or more routers (not shown) and/or switches (not shown). The conference bridge 30 can include a gateway server (not shown). The conference bridge 30 can include a firewall (not shown).

Figure 2:
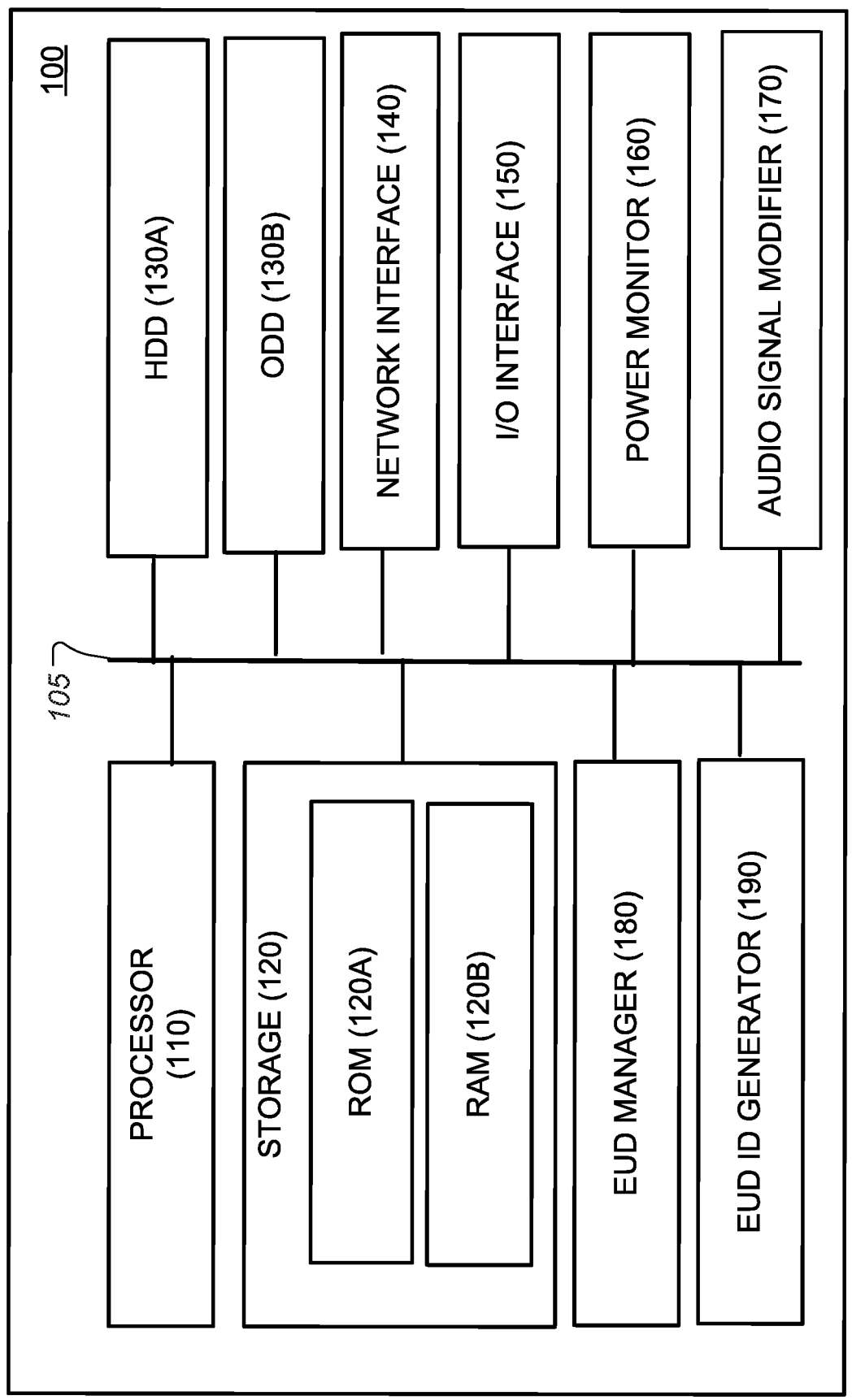
FIG. 2 is a block diagram illustrating an example of a conference manager, which can be provided in the conference bridge and configured to facilitate the conference session in the system of FIG. 1.

The conference server 32 can include a conference manager 100 (shown in FIG. 2).

The conference server 32 can support web-based conferences, dial-in conferences or sua sponte conferences. For a dial-in conference, a predetermined telephone number and an access code can be provided to one or more invitees, who can then use the telephone number and access code to access a conference call via an EUD 10. The access code can be unique to each invitee or EUD 10, or common to all invitees or EUDs 10 for a particular conference call session.

For a sua sponte conference call, a conference controller can administer control of a conference via an EUD 10 (e.g., EUD 10A) by, for example, dialing a phone number of another EUD 10B and, when the called party answers the EUD 10B, pressing a "CONFERENCE" button on the EUD 10A. This process can be repeated by dialing one or more of the other EUDs 10C to 10E.

The disclosure is not limited to the five EUDs 10A to 10E, but can, instead, include fewer than, or more than five EUDs 10.

The network interface 34 can include, for example, a multi-port T1/E1 PSTN interface (not shown) that can support digital T1 or E1 connectivity to the public switched telephone network (PSTN). The network interface 34 can interact with the conference server 32 and can support transcoding or conferencing. The network interface 34 can be configured in the conferencing server 32 to set one or more ports to act as wide area network (WAN) interfaces such as, for example, T1 or E1 hardware-specific interfaces. Each port in the network interface can have a unique media access control (MAC) address that can be defined for transcoder or conferencing purposes.

Referring to FIG. 1, the conference bridge 30 can receive an audio signal from an EUD 10A in a conference call session with one or more EUDs 10B-10E, wherein the audio signal can include a speech signal. The conference bridge 30 can detect and identify the EUDs 10 that are connected to the conference call session and whether such devices are authorized to participate. The conference bridge 30 can generate a unique EUD ID signal for each connected EUD 10 and embed the EUD ID signal into the conference call signal being transmitted to the associated EUD 10, so that each EUD 10 that receives the conference call signal also receives a unique EUD ID signal for that EUD 10 and/or participant using the EUD 10. Alternatively, an EUD 10 can generate a unique EUD ID signal by and for itself and embed the EUD ID signal into the conference call signal being transmitted to the EUD 10 itself, so that the EUD 10 receives the conference call signal and a unique EUD ID signal for the EUD 10 itself and/or the participant using the EUD 10. Each EUD ID signal is embedded in the conference call signal so that it is imperceptible to a human being and includes an indication of the receiving EUD 10 and/or participant. Subsequently, an embedded EUD ID signal can be detected and decoded by, for example, waveform analysis tools. Thus, when a participant makes an unauthorized copy of the conference call signal, the embedded EUD ID signal can be used to identify the participant and/or EUD 10 that made the unauthorized copy.

FIG. 2 illustrates a block diagram of a conference manager 100 operable to execute the disclosed architecture, according to the principles of the disclosure. The conference manager 100 can be one or more devices or one or more modules. The conference manager 100 can be provided in the conference bridge 30 (shown in FIG. 1). The conference manager 100 is configured to implement the various aspects of the conference system 1 disclosed herein.

According to a non-limiting embodiment of the disclosure, some or all of the components of the conference manager 100 can be provided in each of the EUDs 10. For instance, a power monitor 160, an audio signal modifier 170, and an EUD identification signal generator 190 can be included in each EUD 10. The EUD identification signal generator 190 can include a random number generator (not shown). In a non-limiting embodiment of the disclosure, the audio signal modifier 170 and the EUD identification signal generator 190 can include executable instructions that can be executed by one or more computing devices. Similar to the conference manager 100, each EUD 10 can include a processor 110, storage 120, HDD 130A, network interface 140, and I/O interface 150. Some of the EUDs 10 can include an ODD 130B.

In a non-limiting embodiment of the disclosure, software (including an executable computer program) can be downloaded from, for example, a server (e.g., conference server 32, shown in FIG. 1) in the conference system 1 (shown in FIG. 1) or from a secure site located outside the conference system 1. The conference system 1 can be an enterprise network. The computer program, when executed by an EUD 10, can cause the EUD 10 to install and configure the power monitor 160, audio signal modifier 170, and EUD identification signal generator 190 in the EUD 10. The computer program can further cause the EUD 10 to install and configure the EUD manager 180 in the EUD 10. The downloaded software can include computer program instructions, which when executed by the EUD 10, cause the EUD 10 to carry out the watermarking processes described herein. The downloaded software can include any additional data necessary to carry out the scope and purposes of the instant disclosure, as understood by those skilled in the art.

Referring to FIG. 2, the conference manager 100 includes a processor 110, a system storage 120, a power monitor 160, an audio signal modifier 170, an EUD identifier 180, and EUD identification (ID) signal generator 190. The conference manager 100 can include a hard drive device (HDD) 130A, an optical drive device (ODD) 130B, a network interface 140, and/or an input/output interface 150. The conference manager 100 can include a system bus 105. The system bus 105 can be connected to each of the components in the conference manager 100 to facilitate transfer of data and instruction signals between the components 110 to 190.

The processor 110 can be any of various commercially available processors. Dual microprocessors and other multi-processor architectures may also be employed as the processor 110. The processor 110 can be a single processor or can include multiple processors working to instruction one or more components of conference system 1. The processor 110 can instruct the components by executing instructions stored at, for example, storage 120. In one or more implementations, the processor 110 is embedded within the individual components (e.g., audio signal modifier 170).

The system bus 105 can be any of several types of bus structures that may further interconnect to a memory bus (with or without a memory controller), a peripheral bus, and a local bus using any of a variety of commercially available bus architectures.

The system storage 120 includes a read only memory (ROM) 120A and random access memory (RAM) 120B. A basic input/output system (BIOS) may be stored in the ROM 120A, which may include a non-volatile memory, such as, for example, ROM, EPROM, EEPROM, or the like. The BIOS contains the basic routines that help to transfer information between elements within the conference manager 100, such as during start-up. The RAM 120B can include a high-speed RAM such as static RAM for caching data.

The hard disk drive (HDD) 130A can include an internal HDD, such as, for example, an enhanced integrated drive electronics (EIDE) drive, a serial advanced technology attachments (SATA) drive, or the like. The optical disk drive (ODD) 130B can include a CD-ROM disk reader, DVD reader, or the like, which can read/write to high capacity optical media such as CDs, DVDs, etc. The HDD 130A can be configured for external use in a suitable chassis (not shown). The HDD 130A and ODD 130B can be connected to the system bus 105 by a hard disk drive interface (not shown) and an optical drive interface (not shown), respectively. The hard disk drive interface (not shown) may include a Universal Serial Bus (USB) (not shown), an IEEE 1394 interface (not shown), and the like, for external applications.

The HDD 130A and/or ODD 130B, and their associated computer-readable media, can provide nonvolatile storage of data, data structures, computer-executable instructions, and the like. The HDD 130A and/or ODD 130B can accommodate the storage of any data in a suitable digital format.

A number of program modules, including the modules described herein, can be stored in the HDD 130A, ODD 130B, and/or RAM 120B, including an operating system (not shown), one or more application programs (not shown), other program modules (not shown), and program data (not shown). Any (or all) of the operating system, application programs, program modules, and program data can be cached in the RAM 120B. A computer program can be stored in the HDD 130A, ODD 130B, and/or RAM 120B, which when executed by the processor 110, can cause the processes described herein to be carried out.

The conference manager 100 can receive instructions and data signals via the I/O interface 150, which can be communicatively coupled to one or more input/output devices, including, for example, a keyboard (not shown), a mouse (not shown), a pointer (not shown), a microphone (not shown), a speaker (not shown), a display (not shown), and/or the like. The received instruction and data signals can be forward to the processor 110 from the I/O interface 150 via the bus 105.

The conference manager 100 can include a display device (not shown). The display device can be connected to the system bus 105 via the I/O interface 150. The display device (not shown) can be connected to a video driver (not shown) via the system bus 105, which can be included in the conference manager 100.

The conference manager 100 can include a sound reproduction device (not shown), such as, for example, a speaker. The speaker (not shown) can be connected to the system bus 105 via the I/O interface 150. The speaker (not shown) can be connected to an audio driver (not shown) via the system bus 105, which can be included in the conference manager 100.

The network interface 140 can be connected to the network 20 (shown in FIG. 1). The network interface 140 can include a wired or a wireless communication network interface (not shown) and/or a modem (not shown). When used in a local area network (LAN), the conference manager 100 can be connected to the LAN network 20 (shown in FIG. 1) through the wired and/or wireless communication network interface; and, when used in a wide area network (WAN), the conference manager 100 can be connected to the network 20 (shown in FIG. 1) through the modem. The modem (not shown) can be internal or external and wired or wireless. The modem can be connected to the system bus 105 via, for example, a serial port interface (not shown). The network interface 140 can include, for example, a multi-port T1/E1 PSTN interface module (not shown) that can support digital T1 or E1 connectivity to the public switched telephone network (PSTN). The network interface 140 can facilitate transfer of data packets between the conference manger 100 and the EUDs 10, and between the conference manager 100 and the database 40. The data packets can include discrete portions of a conference call signal that, in the aggregate, can reproduce the conference call signal. The conference call signal can include an audio signal received from one or more of the EUDs 10. The audio signal can include a speech (or voice) signal of a participant located at the EUD 10.

The power monitor 160 can measure and track signal characteristics of the conference call signal such as, for example, frequency, period, amplitude, signal level (e.g., in dBm), signal-to-noise-ratio (SNR) (e.g., in dB), power, including peak power (e.g., in V), stress, rhythm, phasing, intonation, tempo, pitch, duration, and the like, of a speech (or voice) signal in the conference call signal. The conference call signal can include one or more of the audio signals from the EUDs 10. The power monitor 160 can measure and track signal characteristics of each audio signal received from the EUDs 10.

The conference manager 100 can, optionally, include a signal amplifier (not shown). The signal amplifier can include an electronic device or circuit that can be used to increase the magnitude of the signal applied to its input. The electronic device or circuit can include a Bipolar Transistor, Field Effect Transistor or Operational Amplifier, which has two input terminals and two output terminals (ground being common) with the output signal being greater than that of the input signal as it has been amplified. The amplified signals can vary as a function of time, frequency, voltage or current.

The audio signal modifier 170 can include executable instructions that, when executed, can modify a portion of the conference call signal with an EUD ID signal provided by the EUD ID signal generator 190 or retrieved from, for example, the database 40 (shown in FIG. 1). The audio signal modifier 170 can dynamically embed the EUD ID signal into the conference call signal, such that the embedded signal is imperceptible to a human being. The audio signal modifier 170 can embed the EUD ID signal in real-time in the conference call signal being transmitted to the associated EUD 10, without introducing any noticeable delay, thereby ensuring quality and clarity of the speech signal(s) in the transmitted conference call signal.

The EUD manager 180 can parse and analyze data packets received from the EUDs 10 to identify each EUD 10 from which the data packets were received. For instance, metadata or header data can be parsed from the received data packets to identify each EUD 10 from which data packets were received at the conference manager 100. Login details or credentials (e.g., user name, email address, telephone number, employee ID number, password, etc.) provided by the EUD 10 to access the conference call session can also be extracted from the received data packets (e.g., from the payload data), so as to identify the particular participant at the EUD 10. The parsed/extracted data can include, for example, a user name, a password, an IP address, a MAC address, a port number, OLI data, CID data, ANI data, CLID data, geolocation data, employee identification data, login credential, and the like, for the EUD 10.

The EUD identification signal generator 190 can generate a unique EUD ID signal for each EUD 10 that participates in a conference call session. The generated EUD ID can include a random number generator (not shown). The EUD ID can include an identifier that uniquely identifies the particular EUD 10 and/or participant. The EUD ID can include, for example, the name, employee identification, or other identifying information of the attendee using the EUD 10, or an IP address, a MAC address, a port number, OLI data, CID data, ANI data, CLID data, geolocation data, login credentials, or any information that can accurately identify the particular EUD 10 and/or participant.

The EUD ID can be generated and embedded in the conference call signal based on the characteristic of the conference call signal measured by the power monitor 160, such that the EUD ID signal is not perceivable, and to ensure clarity and quality of the speech signal(s) in the conference call signal. The EUD ID can be embedded dynamically and in real-time into the conference call signal so that each EUD 10 receives the conference call signal with its own unique EUD ID and without any noticeable delays or other noticeable degradations in the quality or clarity of the speech signal(s). The EUD ID can be detected and used easily to identify the EUD 10 and/or participant.

Referring to FIG. 1, two or more of the EUDs 10 can participate in a conference session created by the conference bridge 30, which can be configured to facilitate the conference session as, for example, a web-based conference call, a VoIP conference call, a PSTN phone conference call, or any other communication scheme that involves bridging two or more speech signals from EUDs 10. A participant in the conference call session can speak into his/her respective EUD 10 and the voice signal can be transmitted simultaneously, via the conference bridge 30, to all other EUDs 10 that are participating in the conference call session. All EUDs 10 can have the same capabilities in the conference call session, or one of the EUDs 10 can be designated as a conference controller and the rest of the EUDs 10 designated as participants. The conference controller can be provided with administrative privileges, such as, for example, identifying participants (e.g., names, email addresses, phone numbers, etc.) that may participate in a conference call session, whether the participants can invite additional callers, the length of the conference call session, the begin and/or end time of the conference call session, and the like.

One of the EUDs 10 (e.g., EUD 10A) can be designated as a main speaker device and the rest of the EUDs 10 (e.g., EUDs 10B-10E) can be designated participating devices. During a period of time, the main speaker device 10A can share speech content with the participating devices 10B-10E in the conference call session. The designation of "main speaker device" can change throughout the conference call session depending on who is speaking and is used herein merely to specify which of the EUDs 10 is currently transmitting a speech signal. The "main speaker device" can be the conference controller, or the EUD 10 from which the speech signal is being received, which can change depending on who is speaking at a particular time.

During a conference call session, the conference bridge 30 can receive login credentials from each EUD 10, including, for example, a user name, an email address, an employee number, a telephone number, a password, and the like. The conference bridge 30 can receive an IP address, a MAC address, a port number, OLI data, CID data, ANI data, CLID data, conference identification data, geolocation data, and the like. The conference bridge 30 can determine which EUD 10 to authorize to participate in the conference call session. The conference bridge 30 can store authorization data for each EUD 10 locally (e.g., in the conference server 32) or remotely (e.g., database 40).

Figure 3:
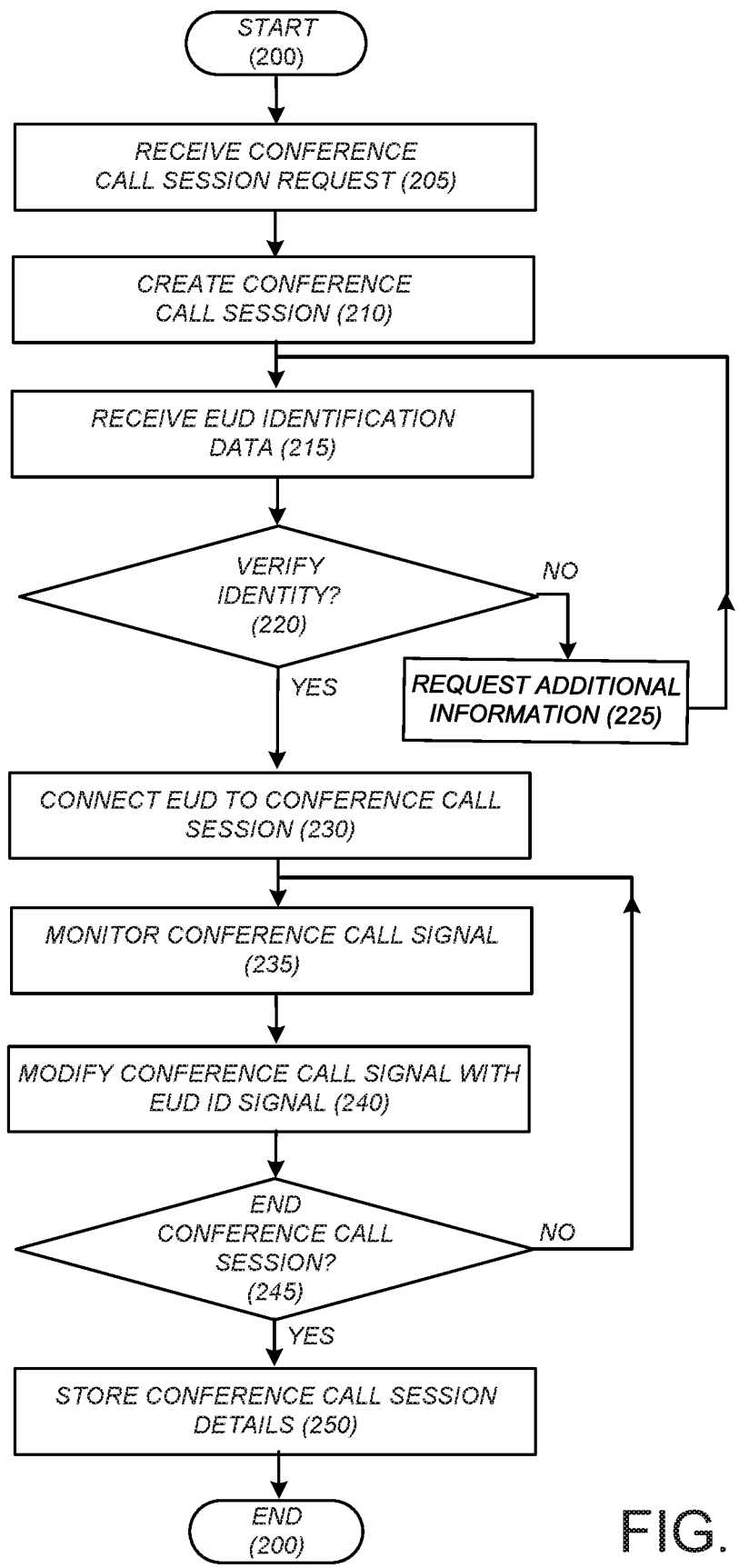
FIG. 3 illustrates a flow diagram depicting an example of an operation that can be carried out by the system of FIG. 1.

FIG. 3 is a flow diagram depicting an example of a conference call watermarking process 200 that can be carried out by the conference bridge 30 (shown in FIG. 1) or the conference manager 100 (shown in FIG. 2) in the conference system 1 (shown in FIG. 1), according to the principles of the disclosure. As noted earlier, the conference manager 100 can be located in the conference bridge 30 (e.g., in the conference server 32).

Referring to FIGS. 1-3, the conference call watermarking process 200 can be initiated by the conference manager 100 upon receiving a conference call session request from an EUD 10 (e.g., EUD 10A) (Step 205), after which the conference manager 100 can create a conference call session (Step 210). The conference call session request can be in the form of a phone call received at the conference bridge 30 from the EUD 10A, such as, for example, where the EUD 10A called a telephone number (e.g., (800) 123-4567) handled by the conference bridge 30. The conference call session request can be in the form of an electronic communication such as, for example, an email, a message (e.g., a text message), a meeting invite, an Application Program Interface (API) call (e.g., RESTful call), a computing resource, or any other call, request, or instruction signal that can prompt the conference manager 100 to initiate a conference call session. The conference call session can include any combination of PSTN, VoIP, web-based, or other communication technology that can conference communication between two or more EUDs 10.

The conference call session request can include identification information for one or more invitees (or EUDs 10) that might participate in the conference call session. For instance, the identification information can include an email address, a user name, an employee number, a telephone number, a password, an access code, or any other unique identifier for each invitee (or EUD 10) that might participate in the conference call session. An invitation to participate in the conference call session can be sent to each invitee at a corresponding EUD 10B-10E from the EUD 10A or the conference manager 100.

The following description is provided with respect to EUD 10B with the understanding that it applies equally to all other EUDs 10 that join the conference call session, including for example, EUDs 10C to 10E.

When an invitee joins the conference call session via a respective EUD 10 (e.g., EUD 10B), the EUD manager 180 can parse packet headers from data packets received from the EUD 10B (Step 215). The EUD manager 180 can extract the IP address of the EUD 10B from the packet header information, as well as other identifying information for the EUD 10B. Before the EUD 10B is permitted to join the conference call session, the EUD 10B can be required to provide a unique identifier such as, for example, an email address, a telephone number, a biometric identification (e.g., fingerprint, retinal image, etc.), and the like, of the participant at the EUD 10B. The EUD 10B can be required to provide a password, an access code, or the like, so as to verify the identity of the participant at the EUD 10B. The EUD manager 180 can store the EUD identification data for the EUD 10B and/or participant in storage 120 and/or database 40 (shown in FIG. 1).

Before permitting the EUD 10C to join the conference call session, the EUD manager 180 can verify whether the EUD 10B and/or the participant is authorized to participate in the conference call session (Step 220). In one non-limiting embodiment, the EUD manager 180 can query the database

40, which can include a listing of all known EUDs 10 and/or individuals that can be authorized to participate in a conference call session, such as, for example, an LDAP directory of all EUDs 10 and/or users in an enterprise network.

If the EUD 10B is not authorized to participate in the conference call session (NO at Step 220), then the EUD manager 180 can send a request for additional information to the EUD 10B (Step 225). If several requests for additional information to the EUD 10B have been sent and EUD 10B is still not authorized to participate in the conference call session (NO at Step 220), then the EUD manager 180 can deny access to the participant using EUD 10B without further request for additional information. If the EUD 10B is authorized to participate in the conference call session (YES at Step 220), then the EUD 10B can be connected to the conference call session (Step 230).

Once the EUD 10B is connected to the conference call session (Step 230), the power monitor 160 can measure and track signal characteristics of the outgoing conference call signal to the EUD 10B (Step 235). The monitored signal characteristics can include, for example, frequency, period, amplitude, voltage level, signal level (e.g., in dBm), signal-to-noise-ratio (SNR) (e.g., in dB), power, including peak power (e.g., in V), stress, rhythm, phasing, intonation, tempo, duration, and the like, of each speech signal in the conference call signal. The power monitor 160 can carry out continuous or periodic sampling of the signal characteristics. The period sampling can include, for example, Nyquist rate sampling.

Based on the signal characteristics measured by the power monitor 160 (Step 235), the conference call signal can be modified by the audio signal modifier 170 to embed an EUD ID ("watermark") signal that is assigned to the destination EUD 10B (or the participant) such that the embedded EUD ID is not perceptible to a listener at the EUD 10B (Step 240). The audio signal modifier 170 can continuously adapt the power level of the EUD ID as it is embedded to ensure that the watermark is hidden and imperceptible to a listener. In a non-limiting example, the EUD ID signal can be at a frequency lower than, for example, about 20 Hz or a frequency higher than, for example, about 20 kHz. The EUD ID signal can be generated by the EUD ID signal generator 190 or retrieved from storage such as, for example, the database 40 (shown in FIG. 1) or the storage 120 (shown in FIG. 2). The EUD ID signal can be generated or retrieved at or prior to the time the EUD 10B is connected to the conference call session (Step 230). The audio signal modifier 170 can be configured to embed the EUD ID signal at discrete time periods (e.g., every 0.01 seconds, 0.1 seconds, 0.5 seconds, 1 second, etc.). Alternatively, the audio signal modifier 170 can embed the EUD ID signal substantially continuously.

The power monitor 160 and audio signal modifier 170 can work together to frame the outgoing conference call signal in real-time, analyze signal characteristic of each speech signal, determine a methodology to embed the EUD ID into the conference call signal, and embed the EUD ID in the outgoing conference call signal in real-time as it is being transmitted to the EUD 10B. Selection and implementation of the embedding technology can be selected and employed such that it does not noticeably delay transmission of the conference call signal to the EUD 10B or any other EUDs 10 participating in the conference call session.

Several different methodologies can be used to embed the EUD ID in the conference call signal, including, for example, a frequency domain (or spread-spectrum) additive process, a spatial domain (or amplitude modulation) additive process, echo hiding, dithering, time-scale modification, low-frequency or high-frequency-based embedding, or any other methodology of embedding a digital EUD ID in the conference call signal that is imperceptible to human hearing and that does not deteriorate or otherwise negatively impact quality or clarity of speech signals in the conference call signal.

For instance, in employing a spread spectrum technique, the EUD ID can be embedded as a narrow-band data sequence into a wide band channel of the speech signal in the conference call signal.

In amplitude modification, a sequence carrying the EUD ID can be used as a substitute for lower order bits of the digital speech signal in the conference call signal.

In the echo hiding technique, the EUD ID data can be embedded into the speech signal by introducing an echo in the time domain. The EUD ID can be embedded by echoing with one of two binary delays (i.e., 0,1).

In the dithering technique, the EUD ID can be added to the speech signal with a probability distribution, such as Gaussian or triangular. The EUD ID can be used to modulate the dither signal.

Time-scale modification involves compressing or expanding the time-scale of the speech signal by the EUD ID.

Each of the available watermarking techniques that can be used to embed the EUD ID into the conference call signal can have different characteristics in terms of robustness, security and computational complexity. The audio signal modifier 170 (shown in FIG. 2) can be configured to be able to implement one or more of a plurality of the techniques, with a suitable technique being selected in real-time based on the watermarking criteria.

To prevent or discourage unauthorized copying of the conference call signal at the EUD 10B, the EUD ID can be embedded in the conference call signal so that it cannot be removed without rendering the speech signal incomprehensible.

In one example, one or more validation models (e.g., checksum) may be used to ensure the integrity of the embedded EUD ID. The EUD ID signal embedment can be configured such that any modification to the EUD ID results in a changed checksum value that fails to validate the authenticity of the shared content. Additionally, the validation model may intentionally corrupt some or all of the of the shared speech signal when the EUD ID is not authenticated. In one example, the validation model may be applied to recordings of a conference call such that any attempt to distribute the shared speech with a digitally removed or modified EUD ID (e.g., with voice editing software) would result in corruption of the recording. In another example, a EUD 10 that detects a failure of the validation model (e.g., an inconsistent checksum) may notify the conference manager 100 and/or a separate monitoring facility about the potential tampering with the EUD ID.

The processes of monitoring (Step 235) and modifying the conference call signal (Step 240) can continue (NO at Step 245) until a determination is made that the conference call session has ended (YES at Step 245), at which time the conference call session details can be stored in, for example, database 40 for later reference (Step 250). The conference call session details can include identification information (including EUD ID) for each EUD 10 that participated in the conference call session, participant information for each participant, date and time(s) of conference call session, a portion (or entirety) of the speech signal received from or sent to each EUD 10, and any other information that can be used to forensically identify an EUD 10 that was the source of an unauthorized copy of the conference call signal.

In addition, the conference call session details can include the recordings of the conference call which can be made and reviewed at a later time. The conference server 32 can be configured to receive a request for the recording from, for example, an EUD 10 via the network 20 and to authenticate the EUD 10 and verify whether the EUD 10 (or its participant) is authorized access to the recording. Upon receiving the request, authenticating the EUD 10 and verifying the EUD 10 and/or the participant is authorized to receive the recording, the conference server 32 can query the database 40 and send the recording to the EUD 10. However, before sending the recording, the conference call signal can be modified to embed an EUD ID for the destination EUD 10. In this regard, one or more characteristics of the conference call signal in the recording can be measured and tracked (e.g., by the power monitor 160, shown in FIG. 2) and the conference call signal can modified (e.g., by the audio signal modifier 170, shown in FIG. 2) to embed the EUD ID signal that is assigned to the EUD 10 (or the participant), such that the embedded EUD ID is not perceptible to a listener at the destination EUD 10.

Figure 4:
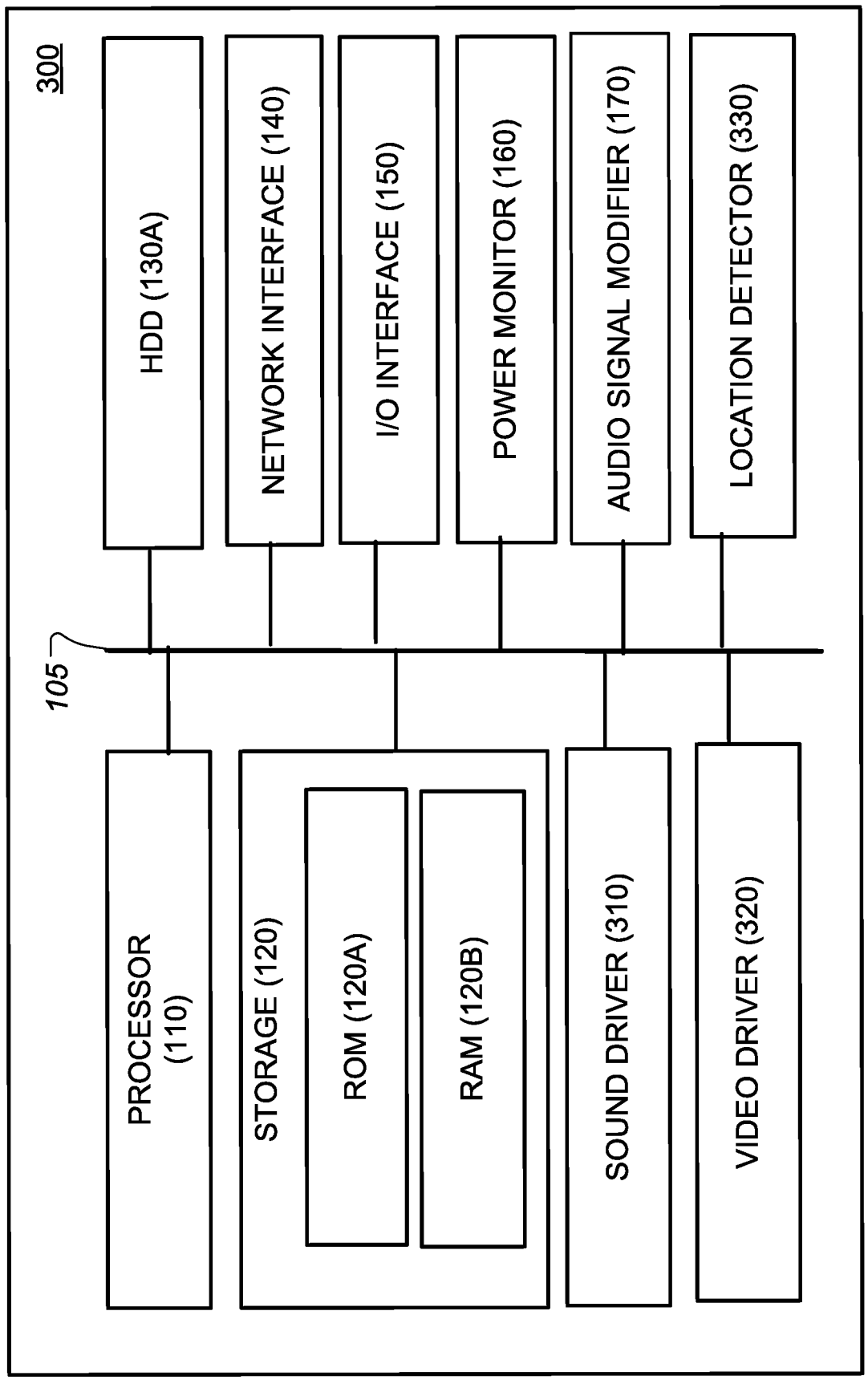
FIG. 4 is a block diagram illustrating an example of a communicating device, which can be provided in one or more end-user-devices in the system of FIG. 1.

FIG. 4 shows an example of a communicating device 300 that can be included in one or more of the EUDs 10 (shown in FIG. 1). As seen in FIG. 4, the communicating device 300 can include components 110-170 that are similar to the components with the same legends in the conference manager 100 (shown in FIG. 2)—that is, the communicating device 300 can include the processor 110, storage 120, HDD 130A, network interface 140, I/O interface 150, power monitor 160, and audio signal modifier 170. The communicating device 300 can further include a sound driver 310, a video driver 320, and/or a location sensor 330.

The sound driver 310 can receive audio signals from a sound transducer (not shown), such as, for example, a microphone and reproduce audio signal on another sound transducer (not shown), such as, for example, a speaker. The sound driver 310 can receive and send audio signals to/from the communicating device 300. The sound driver 310 can facilitate communication and control between the operating system and the sound transducers.

The video driver 320 can facilitate graphics-mode application programs and the operating system to communicate with and control a display device (not shown) to display video at a chosen resolution with the desired colors.

The location sensing device 330 can determine the geolocation of the communicating device 300 at a precise time by processing, for example, signals broadcasted by GPS satellites, LANs, WANs, etc., or by utilizing commercially available technologies such as Google Visual Positioning services (VPS), or the like.

The communicating device 300 can, optionally, include the EUD ID generator 190 (shown in FIG. 2). In which case, the EUD ID generator 190 must be resistant to hacking to prevent unauthorized access to, or manipulation of the EUD ID that is embedded by the audio signal modifier 170 into the received conference call signal. The EUD ID generator 190 can generate or provide an EUD ID that is unique to the EUD 10 in which the communication device 300 is installed. The generated EUD ID can be stored temporarily in RAM 120B, HDD (130A), or long term in database 40 (shown in FIG. 1). The EUD ID can include, for example, the name, employee identification, or other identifying information of the attendee using the EUD 10, or an IP address, a MAC address, a port number, OLI data, CID data, ANI data, CLID data, geolocation data, login credentials, or any information that can accurately identify the particular EUD 10 and/or participant.

When a EUD 10 is communicatively connected to the conference bridge 30, the conference bridge 30 can receive geolocation data from the EUD 10, which can be provided by the location sensor 330 in the EUD 10, parsed from header data in the data packets from the EUD 10, or the like.

The power monitor 160 can measure and track signal characteristics of the received conference call signal at the EUD 10, for example, frequency, period, amplitude, signal level (e.g., in dBm), signal-to-noise-ratio (SNR) (e.g., in dB), power, including peak power (e.g., in V), stress, rhythm, phasing, intonation, tempo, pitch, duration, and the like. Based on the measured signal characteristics, the audio signal modifier 170 can adapt and embed the EUD ID signal real-time into the received conference call signal, dynamically embedding the EUD ID signal into the conference call signal such that the embedded signal is imperceptible to a human being. The EUD ID signal can be embedded in real-time without introducing any noticeable delay, thereby ensuring quality and clarity of the speech signal(s) reproduced on the sound transducer (not shown) in the destination EUD 10.

Figure 5:
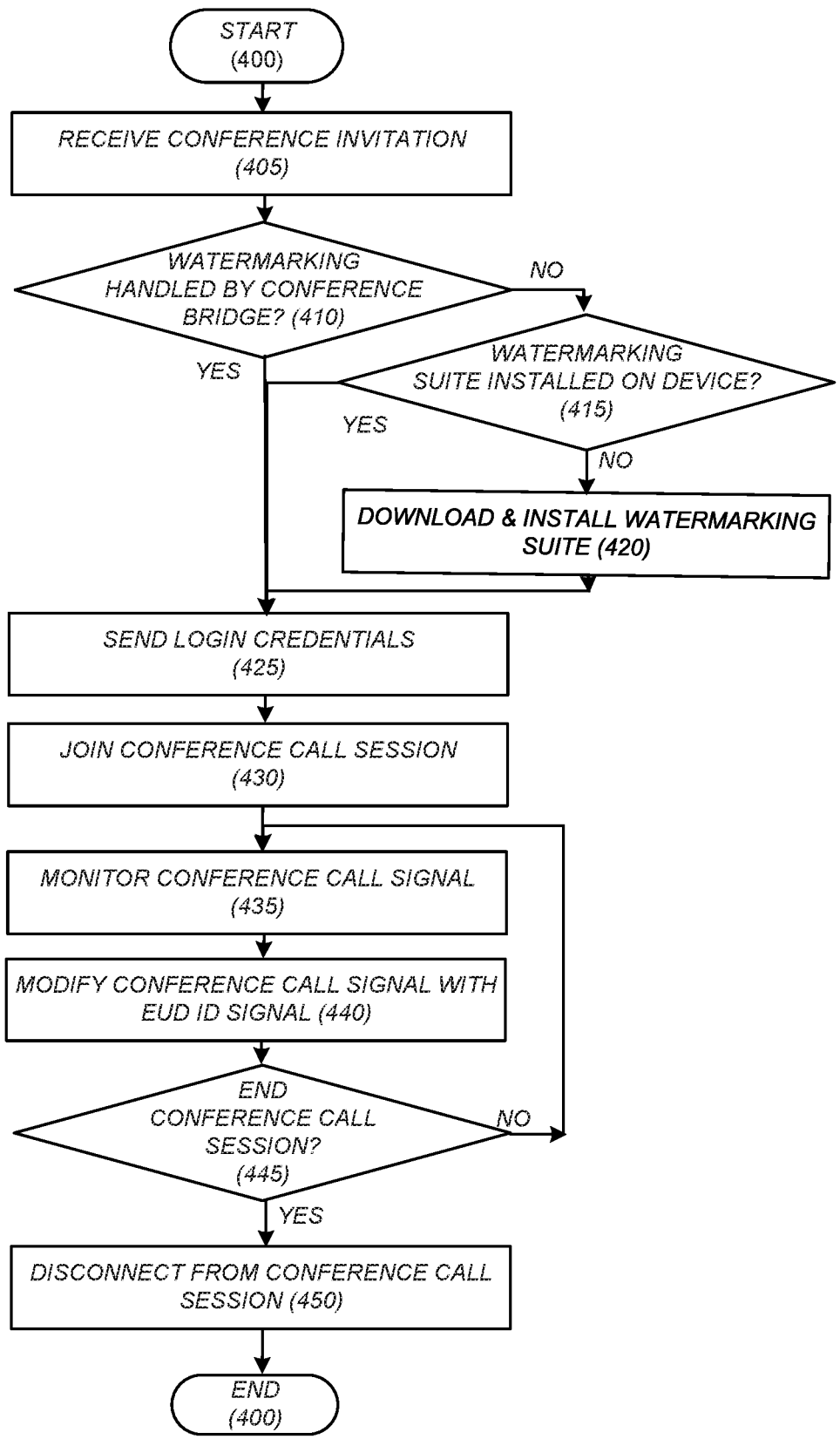
FIG. 5 is a flow diagram depicting an example of attending a conference call session via an end-user-device in the system of FIG. 1.

FIG. 5 is a flow diagram depicting an example of attending a conference call session via an EUD 10 and receiving a watermarked conference call signal in the conference system 1 (shown in FIG. 1), according to the principles of the disclosure. The watermarking process can be carried out by the conference manager 100 (shown in FIG. 2) or the communication device 300 (shown in FIG. 4). As noted earlier, the conference manager 100 can be locate in the conference bridge 30 (e.g., in the conference server 32), and the communication device 300 can be located in one or more of the EUDs 10.

An invitation to participate in the conference call session can be sent to each invitee at a corresponding EUD 10B-10E from the EUD 10A or the conference manager 100. The following description is provided with respect to EUD 10B as the destination EUD with the understanding that it applies equally to all other EUDs 10 and their users that participate in the conference call session, including for example, EUDs 10C to 10E.

The process can start when the EUD 10B receives a conference invitation (Step 405). The conference invitation can be received via email, phone call, a push from a cellphone application, an API, computer application, or the like. A determination can be made (e.g., by the conference bridge 30) whether watermarking is handled by the conference bridge 30 or the EUD 10B (Step 410). If it is determined that watermarking is to be handled by the conference bridge 30 (YES at Step 410), then the EUD 10B can send login credentials to the conference bridge 30 (Step 425). The conference bridge 30 can prompt the EUD 10B to send login credentials. If not (No at Step 410), then a determination can be made whether a watermarking suite is installed on the destination EUD 10B (Step 415).

If it is determined that the EUD 10B includes the watermarking suite (YES at Step 415), then the EUD 10B can send login credential to the conference bridge 30 (shown in FIG. 1) (Step 425), otherwise (NO at Step 415) the EUD 10B can download and install the watermarking suite (Step 420). The watermarking suite can include, for example, a power monitor 160 (shown in FIG. 4) and an audio signal modifier 170 (shown in FIG. 4). The watermarking suite can include an EUD ID generator 190 (shown in FIG. 2). The watermarking suite can include executable instructions that, when executed by the processor 110 (shown in FIG. 4), can monitor one or more signal characteristics of a received conference call signal and dynamically embed an EUD ID in real-time into the received conference call signal before reproducing a sound signal in the received conference call signal at the EUD 10 (e.g., via a speaker), so that the sound signal is reproduced with the embedded EUD ID for that particular EUD 10.

The login credentials sent to the conference bridge 30 by the EUD 10B (Step 425) can include an email address, a user name, an employee number, a telephone number, a password, an access code, or any other unique identifier for the user and/or the EUD 10B. After receiving login credentials, the conference bridge 30 (e.g., the EUD manager 180 in the conference bridge 30) can verify whether the EUD 10B and/or the user of the EUD 10B is authorized to participate in the conference call session. In one non-limiting embodiment, the conference bridge 30 can query the database 40, which can include a listing of all known EUDs 10 and/or individuals that can be authorized to participate in the conference call session, such as, for example, an LDAP directory of all EUDs and/or users in an enterprise network.

Once the user and/or the EUD 10B is authenticated and verified as authorized to participate in the conference call session, the EUD 10B is permitted to and joins the conference call session (Step 430). Once the EUD 10B joins the conference call session, the EUD 10B receives a conference call signal that includes a sound signal from one or more of the EUDs 10A, 10C-10E (shown in FIG. 1). One or more signal characteristics of the received conference call signal can be measured and tracked (e.g., by the power monitor 160, shown in FIG. 4) (Step 435) and the received signal dynamically modified (e.g., by the audio signal modifier 170, shown in FIG. 4) with the EUD ID for the EUD 10B (Step 440). The monitored signal characteristics can include, for example, frequency, period, amplitude, voltage level, signal level (e.g., in dBm), signal-to-noise-ratio (SNR) (e.g., in dB), power, including peak power (e.g., in V), stress, rhythm, phasing, intonation, tempo, duration, and the like, of each speech signal in the conference call signal. The power monitor 160 can carry out continuous or periodic sampling of the signal characteristics. The period sampling can include, for example, Nyquist rate sampling.

Based on the measured signal characteristics (e.g., measured by the power monitor 160) (Step 435), the conference call signal can be modified (e.g., by the audio signal modifier 170) (Step 440) to embed the EUD ID for the EUD 10B (or the participant) such that the embedded EUD ID is not perceptible to a listener at the EUD 10B when the conference call signal (and, more specifically, the sound signal in the conference call signal) is reproduced on, for example, a speaker (not shown) in the EUD 10B. The audio signal modifier 170 can, for example, intermittently or continuously adapt a voltage or power level of the EUD ID signal as it is embedded in the conference call signal to ensure that the watermark is hidden and imperceptible to a listener. The EUD ID signal can be generated by the signal generator 190 or retrieved from storage such as, for example, the database 40 (shown in FIG. 1) or the local storage 120 (shown in FIG. 4).

The EUD 10B can exit the conference call session at any time and end participation in the conference call session (YES at Step 445). When the conference call session ends (YES at Step 445), the EUD 10B disconnects from the conference bridge 30 (Step 450), otherwise (NO at Step 445), the received conference call signal is monitored and modified with the EUD ID until the conference call session ends.

Figure 6:
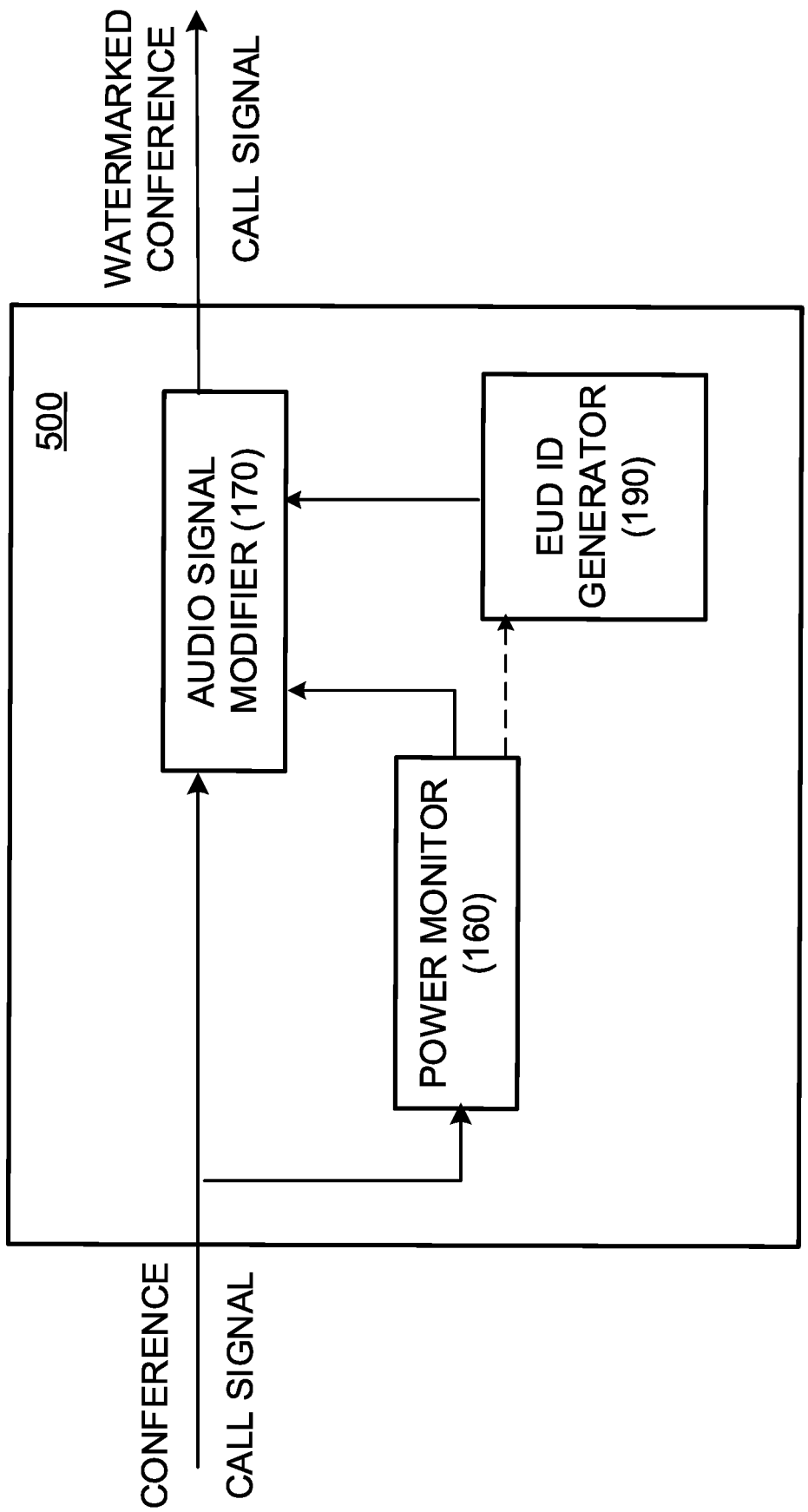
FIG. 6 is a schematic illustration of a watermarking unit that can be implemented in the conference bridge and/or one or more of the communicating devices in the system of FIG. 1.

FIG. 6 shows a schematic illustration of a watermarking unit 500 that can be implemented in the conference bridge 30 (e.g., in the conference manager 100, shown in FIG. 2) or in the EUD 10 (e.g., in the communicating device 300, shown in FIG. 4), according to one or more embodiments of the present disclosure.

Referring to FIG. 6, the watermarking unit 500 can receive a conference call signal that can include at least one speech signal originating from an EUD 10 (shown in FIG. 1). The watermarking unit 500 can include the power monitor 160 and audio signal modifier 170. The watermarking unit 500 can include the EUD ID generator 190. The power monitor 160 can measure one or more characteristics of the received signal, including, for example, frequency, period, amplitude, voltage level, signal level (e.g., in dBm), signal-to-noise ratio (SNR) (e.g., in dB), power, including peak power (e.g., in V), stress, rhythm, phasing, intonation, tempo, duration, and the like, of each speech signal in the conference call signal. Based on the measured signal characteristic(s), the audio signal modifier 170 can embed the EUD ID for the particular destination EUD 10. The EUD ID generator 190 can provide the EUD ID to the audio signal modifier 170, which will then dynamically embed the EUD ID in real-time in the conference call signal to output a watermarked conference call signal. The audio signal modifier 170 can adjust one or more characteristics of the EUD ID signal such that the EUD ID is imperceptible by a human listener.

Generation of the EUD ID signal can be based on the characteristics of the conference call signal measured by the power monitor 160, such that one or more characteristics (e.g., voltage level, power level, frequency, etc.) of the generated EUD ID signal are dependent on one or more characteristics of the conference call signal.

The audio signal modifier 170 can modify a portion of the conference call signal with an EUD ID signal generated by the EUD ID signal generator 190 or retrieved from, for example, local storage 120 (shown in FIG. 2 or 4) or the database 40 (shown in FIG. 1).

Figure 7:
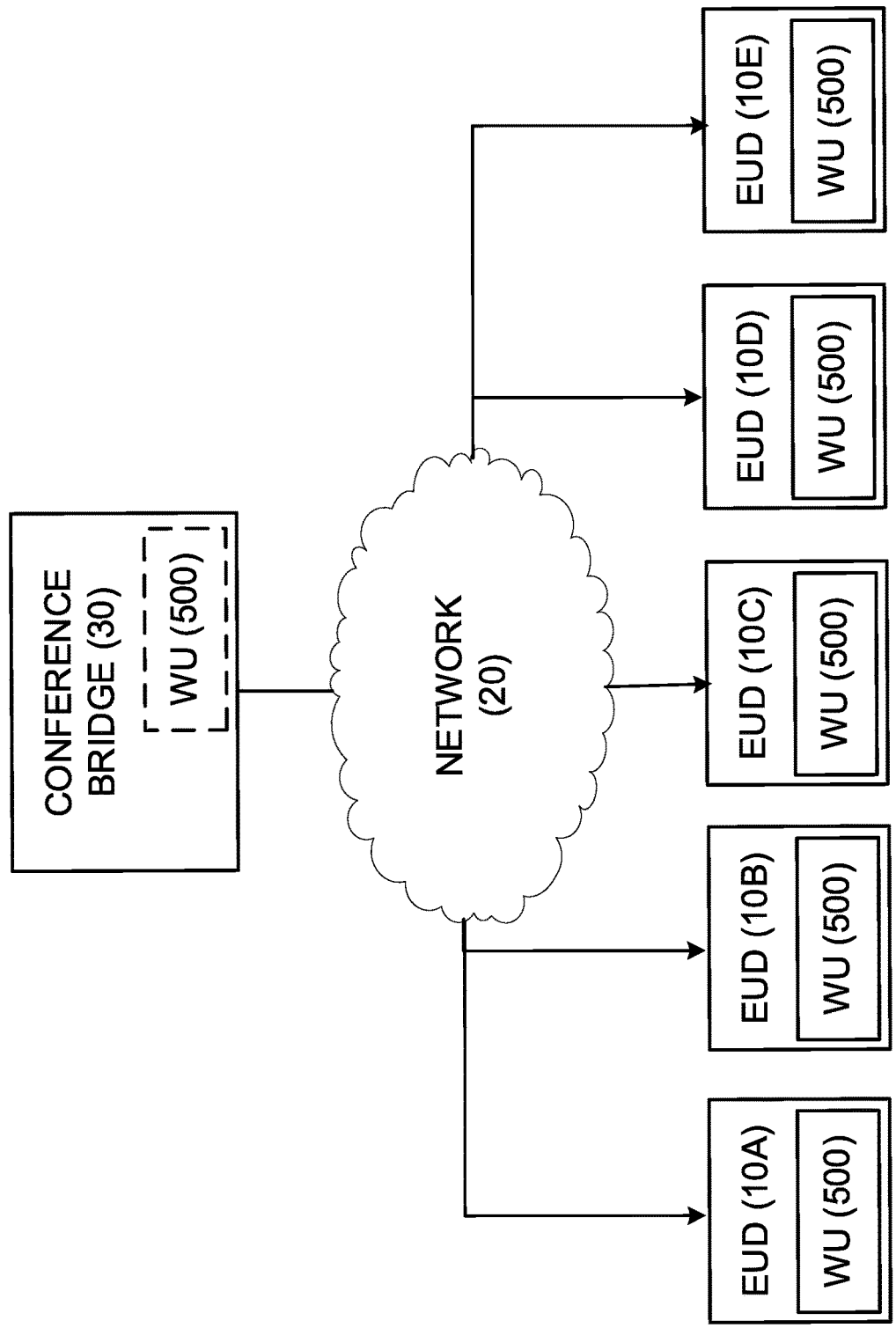
FIG. 7 is a simplified block diagram illustrating a conference call session attended by a plurality of end-user-devices, according to an embodiment of the present disclosure.

FIG. 7 shows a simplified block diagram illustrating an example of a conference call session attended by EUD 10A, 10B, 10C, 10D, 10E with watermarking units 500 included in the conference bridge 30 and/or one or more EUDs 10. Each EUD 10 participating in the conference call session can communicate with each other EUD 10 via the conference bridge 30 and network 20. Each conference call signal received by an EUD 10 must include a watermark, which can be provided by the conference bridge 30 or provided internally by the EUD 10 via a watermarking unit 500.

In one non-limiting embodiment, the watermarking unit 500 is embedded in the conference bridge 30. Whenever a new EUD 10 joins a conference call session, the watermarking unit 500 (e.g., via the EUD ID generator 190) can generate a unique EUD ID signal for the newly connected EUD 10. The EUD ID signal can include an identifier that uniquely identifies that particular EUD 10 and/or participant.

The terminology used herein is for the purpose of describing particular embodiments only and is not intended to be limiting of the disclosure. Terms of orientation are used herein merely for purposes of convention and referencing and are not to be construed as limiting.

As used herein, the singular forms "a," "an" and "the" are intended to include the plural forms as well, unless the context clearly indicates otherwise.

The term "communicating device," as used in this disclosure, means any computing device, hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation. The communicating device can be portable or stationary.

The term "communication link," as used in this disclosure, means a wired or a wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, WiFi, WiMAX, IEEE 802.11, DECT, 0G, 1G, 2G, 3G, 4G, 5G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computing resource," as used in this disclosure, means software, a software application, a web application, a web page, a computer application, a computer program, computer code, machine executable instructions, firmware, or the like. A computing resource can include an email account, a user account, a network account, or the like.

The term "computer-readable medium," as used in this disclosure, means any tangible non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, Bluetooth, or the like.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The term "end-user-device" or "EUD," as used in this disclosure, means any computing device, hardware, firmware, or software that can transmit or receive audio signals, data packets, instruction signals, data signals or any form of information-containing signals over a communication link. The hardware, firmware, or software can include, for example, a telephone, a smart phone, a personal data assistant (PDA), a smart watch, a tablet, a computer, a software defined radio (SDR), or the like, without limitation. The EUD can be portable or stationary. The EUD can include a computing resource and/or a computer readable medium. The EUD includes a speaker or other sound reproducing device. The EUD can include a microphone or other sound pickup device. The EUD can include a display or other image rendering device. The EUD can include a communicating device.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, a Public Switched Telephone Network (PSTN), a Private Branch Exchange (PBX), a Mobile Telephone Service (MST), a Satellite Telephone Service (STS), or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP, etc.

The term "public media," as used in this disclosure, means any communication system or methodology that is accessible to a third party, such as, for example, an unauthorized or unapproved party. The communication system can include, for example, a television broadcasting system, a radio broadcasting system, a publishing system, a streaming service, the Internet, or any other media that can render, reproduce, transmit, or otherwise make available a portion of an audio signal to a third party.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

The term "transmission," as used in this disclosure, means the conveyance of signals via electricity, acoustic waves, light waves and other electromagnetic emissions, such as those generated with communications in the radio frequency (RF) or infrared (IR) spectra. Transmission media for such transmissions can include coaxial cables, copper wire and fiber optics, including the wires that comprise a system bus coupled to the processor.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claims. These examples are merely illustrative and are not meant to be an exhaustive list of all possible designs, embodiments, applications, or modifications of the disclosure.

What is claimed is:

1. A computer-implemented method for identifying a source of an unauthorized copy of a speech signal in a conference call session that includes a plurality of end user devices, the method comprising:

receiving the speech signal during the conference call session;
monitoring a characteristic of the received speech signal;
providing a watermark signal for a destination end user device of the plurality of end user devices and that comprises a speaker device;
adjusting a corresponding characteristic of the watermark signal based on the monitored characteristic of the received speech signal;
dynamically embedding the adjusted watermark signal in real-time in the received speech signal to generate a modified speech signal;
sending the modified speech signal for reproduction on the speaker device;
receiving the modified speech signal from the destination end user device as the unauthorized copy of the speech signal; and
identifying the destination end user device as the source of the unauthorized copy of the speech signal from among the plurality of end user devices by extracting the adjusted watermark signal from the received modified speech signal,
wherein the adjusted watermark signal uniquely identifies the destination end user device, and
wherein the adjusted watermark signal is imperceptible to a human being during reproduction on the speaker device.

2. The computer-implemented method according to claim 1, wherein the monitored characteristic of the received speech signal includes a signal level of the received speech signal.

3. The computer-implemented method according to claim 1, wherein the monitored characteristic of the received speech signal includes a power level of the received speech signal.

4. The computer-implemented method according to claim 1, wherein the receiving the speech signal during the conference call session comprises receiving the speech signal at a conference bridge server.

5. The computer-implemented method according to claim 1, wherein the receiving the speech signal during the conference call session comprises receiving the speech signal at the destination end user device.

6. The computer-implemented method according to claim 1, wherein the receiving the speech signal during the conference call session comprises receiving the speech signal from one of the plurality of end user devices.

7. The computer-implemented method according to claim 1, wherein the adjusted watermark signal comprises login credentials.

8. The computer-implemented method of claim 1, further comprising amplifying the received speech signal.

9. The computer-implemented method of claim 1, wherein the adjusting the corresponding characteristic of the watermark signal comprises amplifying the watermark signal.

10. The computer-implemented method of claim 1, wherein the adjusted watermark signal contains a high frequency signal or a low frequency signal that is imperceptible by a human auditory system.

11. The computer-implemented method of claim 1, wherein the watermark signal is provided from a database.

12. The computer-implemented method of claim 1, wherein the watermark signal is generated by an end user device identification signal generator.

13. An apparatus for identifying a source of an unauthorized copy of a speech signal in a conference call session that includes a plurality of end user devices, the apparatus comprising:
- a network interface that receives the speech signal during the conference call session;
- a power monitor that measures one or more characteristics of the received speech signal;
- an audio signal modifier that
   - is provided a watermark signal for a destination end user device of the plurality of end user devices and that comprises a speaker device,
   - adjusts a corresponding one or more characteristics of the watermark signal based on the measured one or more characteristics of the received speech signal, and
   - dynamically embeds the adjusted watermark signal in real time in the received speech signal to provide a modified speech signal; and
- a source identifier that receives the modified speech signal from the destination end user device as the unauthorized copy of the speech signal, and identifies the destination end user device as the source of the unauthorized copy of the speech signal from among the plurality of end user devices by extracting the adjusted watermark signal from the received modified speech signal,
- wherein the adjusted watermark signal uniquely identifies the destination end user device,
- wherein the modified speech signal is sent for reproduction on the speaker device, and
- wherein the adjusted watermark signal is imperceptible to a human being during reproduction on the speaker device.

14. The apparatus of claim 13, wherein the measured one or more characteristics of the received speech signal include a signal level of the received speech signal.

15. The apparatus of claim 13, further comprising an end user device identification signal generator that generates the watermark signal.

16. The apparatus of claim 13, further comprising a conference bridge server.

17. The apparatus of claim 13, further comprising the destination end user device.

18. The apparatus of claim 13, wherein the watermark signal is retrieved from a storage or a database.

19. The apparatus of claim 13, wherein the adjusted watermark signal comprises login credentials.

20. A non-transitory computer readable storage media containing computer executable instructions, which when executed by one or more processors, cause a computing device to:
- receive a speech signal during a conference call session that includes a plurality of end user devices;
- monitor a characteristic of the received speech signal;
- provide a watermark signal for a destination end user device of the plurality of end user devices and that comprises a speaker device;
- adjust a corresponding characteristic of the watermark signal based on the monitored characteristic of the received speech signal;
- dynamically embed the adjusted watermark signal in real-time in the received speech signal to generate a modified speech signal;
- send the modified speech signal for reproduction on the speaker device;
- receive the modified speech signal from the destination end user device as an unauthorized copy of the speech signal; and
- identify the destination end user device as the source of the unauthorized copy of the speech signal from among the plurality of end user devices by extracting the adjusted watermark signal from the received modified speech signal,
- wherein the adjusted watermark signal uniquely identifies the destination end user device, and
- wherein the adjusted watermark signal is imperceptible to a human being when the modified speech signal is reproduced on the speaker device.

* * * * *